Oct. 22, 1935.    W. A. HEANEY    2,018,555
REGULATOR
Filed June 15, 1931    2 Sheets-Sheet 1

Inventor
Wm A. Heaney
by Kenway & Witter
Attorneys

Oct. 22, 1935.                 W. A. HEANEY                 2,018,555
                                 REGULATOR
                      Filed June 15, 1931         2 Sheets-Sheet 2

Inventor
Wᵐ A. Heaney
by Kenway + Witter
Attorneys

Patented Oct. 22, 1935

2,018,555

UNITED STATES PATENT OFFICE 2,018,555

REGULATOR

William A. Heaney, Salem, Mass., assignor to Locke Regulator Company, Salem, Mass., a corporation of Massachusetts Application June 15, 1931, Serial No. 544,463

14 Claims. (Cl. 137—158)

This invention relates to regulators for fluid-driven engines and more especially steam-driven turbines. One object of the invention is to provide an improved regulator for controlling the speed of these engines by a throttling of the fluid supply to insure a steady and uniform rate regardless of load conditions.

Turbines and like engines are nicely balanced and operate with a delicate smoothness particularly since the operating and controlling functions are substantially all performed by fluid pressure. One of the objects of my invention is further to refine this smooth operation by novel mechanism preferably embodying the use of fluid pressure. Turbine bearings are usually lubricated by an oil pump built into the turbine and operated directly therefrom, the oil pressure from this pump, of course, rising and falling as the turbine speed increases and decreases. In one aspect my invention proposes to use this delicate change in oil pressure to provide automatic and elastic control of the speed of the turbine, thereby giving a smoother and more uniform speed regulation. The construction of my invention preferably embodies a main valve of the floating type which is operated in the opening and closing directions by unbalanced pressures of steam against opposite faces thereof, and my improved regulating mechanism embodies means for controlling automatically these pressures to such a fine and accurate degree as to provide proper and uniform balance of the valve in accordance with the turbine speed.

The speed-regulating mechanism of my invention is of such nature as to cause opening of its steam-controlling valve in inverse proportion to the fluid pressure produced by the oil pump and under normal conditions the valve opening will be proportional to the speed of the turbine. However, should any breakage occur in the fluid pressure system, it is obvious that the fluid pressure would drop and the valve be permitted to open wide and thus cause a racing of the turbine. An important feature of my invention, accordingly, is a safety device in such cooperative relation with the regulating mechanism as automatically to cause a closing of the main valve in such an emergency or whenever the fluid pressure drops to a predetermined minimum.

When the steam is turned off and the turbine is idle, the main governing valve is normally closed through the said safety device and normally remains closed until rotation of the turbine has caused a building up of sufficient fluid pressure to render the safety device inoperative to such closing function. Another feature of my invention is a manually-controlled mechanism for temporarily rendering the safety device inoperative to hold the main valve closed, the purpose of this device being to permit opening of the main valve in initially starting the turbine and getting it under sufficient momentum to produce a fluid pressure above the said predetermined minimum.

In the accompanying drawings I have illustrated one specific embodiment of my invention but it will be understood that the invention can be otherwise embodied and that the drawings are not to be construed as defining or limiting the scope of the invention, the claims appended hereto being relied upon for that purpose.

Referring to the figures of the drawings.

Figure 2:
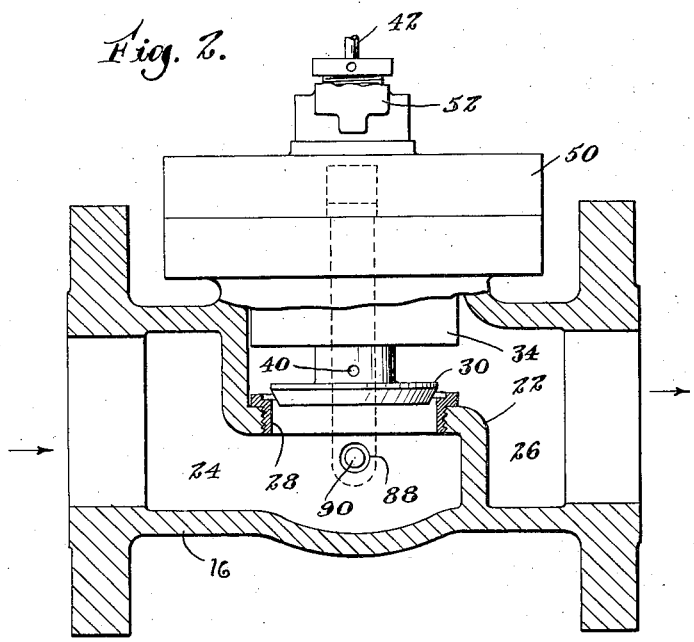
Fig. 2 is an enlarged sectional view longitudinally through the main governing valve shown in Fig. 1.
Figure 1:
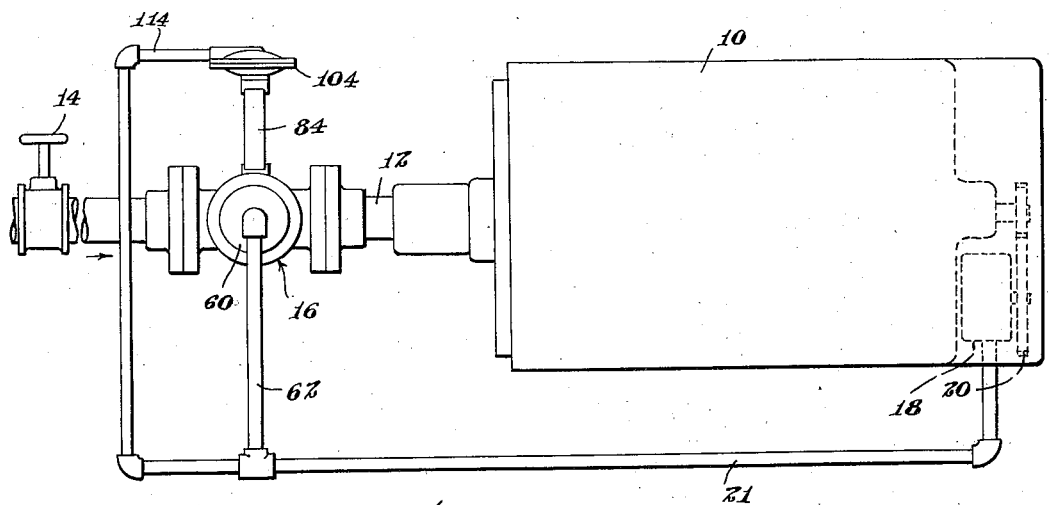
Fig. 1 is a somewhat diagrammatic plan view showing a system embodying my invention.

Referring first to Fig. 1 of the drawings, 10 indicates a turbine driven by steam conducted through a pipe 12 and controlled by a hand throttle 14, and an automatic speed-governing valve 16. Built into or adjacent to the turbine is an oil pressure pump 18 which may be used for supplying lubricant to the turbine bearings, this pump being driven directly from the turbine, as through reduction gears 20. The oil pressure produced by this pump is, of course, directly proportional to the speed of the turbine and in accordance with my invention I propose to utilize this same pressure for controlling automatically, through the valve 16, the steam supply and, therefore, the speed of rotation of the turbine. Oil is conducted from the pump through a pipe 21 for this purpose. I will now proceed to describe the valve 16 and its cooperating mechanism.

The valve 16 is divided by a partition 22 into a steam-inlet chamber 24 and a steam exit chamber 26, a valve seat 28 being threaded into the horizontal portion of this partition. The valve gate or poppet 30 is adapted to engage this seat and is guided thereonto by a piston-like rear portion 32 engaging the wells of a sleeve 34 providing a pressure chamber 36. A relatively small port 38 is provided through the poppet whereby steam may pass into the chamber 36 from the chamber 24 and, if no exit were provided for the escape of steam from the chamber 36, the valve would be held closed on its seat 28 since the steam-engaging area of the piston 32 within the chamber 36 is greater than the steam-engaging area on the face of the poppet within the chamber 24. Steam is, however, permitted to escape from the chamber 36 through a relatively large port 40 and this escape is controlled by a steam 42 having a conical end fitted to the port. This stem extends outwardly through a stuffing box 44 held between two bushings 46 and 48 threaded into the valve cover 50.

Figure 3:
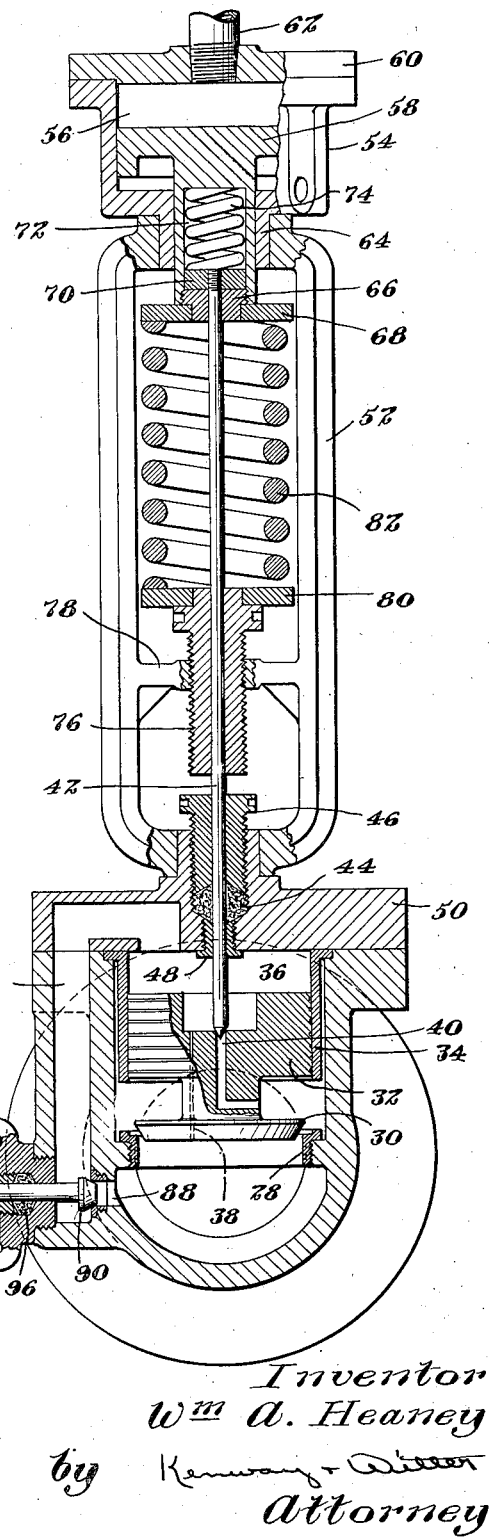
Fig. 3 is a sectional view transversely through this valve and also showing in section the valve-controlling and safety mechanism cooperating therewith.

Mounted on the cover 50 about the bushing 46 is an upwardly-extending frame 52 carrying a housing 54 at its top end and working within a cylindrical pressure chamber 56 in this housing is a piston 58, the top of the chamber being closed by a plate 60 having a pipe 62 connecting the pipe 21 with the chamber. The piston 58 is guided for longitudinal movement in a bearing 64 and has its lower end threaded to a plug 66 seated into a washer 68. The stem 42 extends through the plug 66 and is provided with a head 70 sliding within a chamber 72 in the piston 58. The stem is freely slidable within the plug 66 and is normally held in the extreme position of Fig. 3 by a spring 74.

The intermediate portion of the stem 42 is guided within a bushing 76 threaded into an inwardly-extending portion 78 of the frame. A washer 80 is carried on the top end of this bushing and a compression spring 82 surrounds the stem and has its ends engaged against the washers 68 and 80. This spring normally forces the stem 42 outwardly, which action is balanced by the fluid pressure within the cylinder 56, as hereinafter described.

The function of the above-described mechanism is to control automatically the speed of operation of the turbine 10 by regulating the passage of steam through the valve 16. Since, however, this mechanism is associated with the safety device mechanism 84, particularly through a connecting port 86 from the chamber 36, it will be necessary to describe the safety device 84 before proceeding with a description of the operation of either mechanism. I will, therefore, now proceed to describe the device 84.

The chamber 36 is connected to the chamber 24 through ports 86 and 88. The port 88 is controlled by a valve 90 on a valve stem 92 extending outwardly of the valve 16 and supported within the frame 84 threaded into the valve 16. The stem extends through a stuffing box 96 and its intermediate portion is supported by a bushing 98 threaded into an inwardly-extending portion 100 of the frame. A post 102 threaded to the outer end of the stem slides within a housing 104 carried by the frame 84 and a spring 106 between the bushing 98 and post 102 normally moves the valve 90 to the open position. The enlarged outer end 108 of the post rests against a diaphragm 110 within a chamber 112 of the housing and a pipe 114 provides communication between the pipe 21 and the housing chamber at the opposite side of the diaphragm. Sufficient fluid pressure on the diaphragm is, therefore, adapted to overcome the action of the spring 106 and hold the valve 90 closed. This valve may also be held closed manually by means of a hand lever 116 pivoted to the frame at 118 and engaging at 120 against the outer end of the stem 92.

The function of the mechanism at 52 is to regulate the speed of the turbine and the function of the mechanism at 84 is to cause the valve 16 to close should the controlling force of the mechanism 52 fail. I will now proceed to describe the operation of these mechanisms.

When the turbine is idle, there will be no pressure within the pipe 21 and, therefore, the springs 82 and 106 will respectively hold their stems 42 and 92 fully retracted and thus leave the ports 40 and 88 open. When the hand throttle 14 is opened to start the turbine, steam would normally flow through the ports 88 and 86 and build up a pressure in the chamber 36, keeping the poppet 30 closed, but such action is prevented by use of the hand lever 116 when starting the turbine. When starting the turbine, the valve 90 is held closed by the hand lever 116. Steam pressure on the front face of the poppet 30 will thereupon open the poppet, the steam passing through the relatively small port 38 escaping through the exhaust port 40. The turbine will thus be started and as its speed increases and the fluid pressure in the pipe 21 builds up, the stem 42 is forced forwardly in a manner moving the poppet forwardly and closing the port 40. Steam pressure thereupon builds up in the chamber 36 and acts to further close the poppet, which movement and building up of pressure in this chamber is dependent upon the position of the stem 42 which stem is, in turn, actuated by the fluid pressure in pipe 21 and cylinder 56 produced by rotation of the turbine. Excessive pressure within the pipe 21 causes forward movement of the stem 42 and closing of the port 40, whereby to cause a closing movement of the poppet; and reduced pressure within the pipe 21 causes retraction of the stem 42 and opening of the port 40, whereby to cause opening movement of the poppet. It will be understood that in normal operation the poppet reaches a position of balance and uniformly retains that position with little variation. When the turbine has attained a speed providing sufficient fluid pressure on the diaphragm 110 to keep the valve 90 closed, the lever 116 may be released. The turbine speed which is maintained by this controlling mechanism may be varied by adjusting the bushing 76, which changes the active strength of the spring 82, compressing this spring requiring a greater fluid pressure and, therefore, a higher turbine speed to balance the same, and extending the spring requiring less fluid pressure and, therefore, a lower turbine speed. The spring 74 provides a resilient connection between the stem 42 and the piston 58 whereby to prevent breakage of the stem or other damage should an abnormally large fluid pressure be built up within the cylinder 56.

Should the fluid pressure in the pipe 21 fail for any reason, as by breakage of the pipe, the spring 82 would completely withdraw the stem 42 and permit the poppet 30 to open wide and thereby normally cause racing of the turbine. This possibility is eliminated, however, by the safety mechanism at 84, for when the fluid pressure drops to a predetermined minimum the pressure on the diaphragm 110 becomes less than the force of the spring 106, which spring thereupon acts to open the valve 90. Steam thereupon rushes through the ports 88 and 86 and builds up a pressure in the chamber 36, moving the poppet to and holding it in closed position. The active strength of the spring 106 may be varied by adjusting the bushing 98.

The construction and operation of my improved regulator are believed to be obvious from the above description and accompanying drawings. The fluid pressure within the pipe 21 is directly proportional to the turbine speed and any variation in this pressure acts to cause immediately and automatically a corresponding movement of the poppet 30 of valve 16. The delicate smoothness of turbine operation, which is quite wholly due to the direct operation thereof by fluid pressure, is, therefore, extended to also include the automatic controlling of such operation by fluid pressure, directly produced by rotation of the turbine in conjunction with the balanced and unbalanced pressures on the opposite faces of the gate-piston 30—32. It is furthermore pointed out that the use of a single poppet or gate 30 renders it possible for my improved regulator to close the valve with an extreme tightness at all temperatures, this being impossible with double seated valves heretofore commonly used since the connection between the two poppets of such valve changes in length with change of temperature. It will also be understood that the single poppet also eliminates the fine and accurate grinding and fitting for different temperatures heretofore necessary with double poppet valves.

While I have herein illustrated and specifically described my invention in connection with a steam driven turbine and an embodiment thereof utilizing fluid pressure in large degree for performing the controlling functions, it will be understood that, in its broader aspect, the invention relates to the regulating of any fluid for which it is capable of being used and that certain novel features of the invention are susceptible of considerable modification within the scope of the appended claims.

Having thus described my invention, what I claim as new and desire to secure by Letters Patent is:

1. In a regulator, a steam-conducting pipe, a valve therein, a fluid pressure-producing pump actuated by steam passing through the valve, means including a member actuated by said fluid pressure for automatically controlling the passage of steam through the valve, and other means including a steam conducting port and a normally open valve member actuated in a closing direction by said fluid pressure to close said port, said other means acting automatically to cause the closure of the first-named valve by steam pressure when said fluid pressure reaches a predetermined minimum.

2. In a regulator, a steam-conducting pipe, a valve therein and including a gate and a steam chamber rearwardly thereof and having a steam exit port therefrom, a fluid pressure-producing pump actuated by steam passing through the valve, and means including a member actuated by said fluid pressure for controlling automatically the passage of steam through the valve by controlling the passage of steam through said port.

3. In a regulator, a steam-conducting pipe, a valve therein and including a valve casing having a valve seat and a pressure chamber, the front end of said chamber being open to the pipe forwardly of the valve seat, a valve poppet movable toward and from the seat and having a piston rearwardly thereof working in the pressure chamber, a fluid pressure-producing pump driven by steam passing through the valve, means providing a steam exit port from said chamber and a relatively small entrance port into the chamber from said pipe forwardly of the poppet, means including a member actuated by said fluid pressure in a direction to close the exit port, means tending to move said member in the opposite direction, and means for adjusting the active strength of the last-named means.

4. In a regulator, a steam-conducting pipe, a valve therein and including a valve casing having a valve seat and a pressure chamber, the front end of said chamber being open to the pipe forwardly of the valve seat, a valve poppet movable toward and from the seat and having a piston rearwardly thereof working in the pressure chamber, fluid pressure within the chamber acting to close the poppet and the steam-engaging area of and for opening the poppet being less than the steam-engaging area of the piston within the chamber for closing the poppet, a fluid pressure-producing pump driven by steam passing through the valve, means providing a steam exit port from said chamber and a relatively small steam entrance port into the chamber from said pipe forwardly of the poppet, means including a member actuated by said fluid pressure in a direction to close the exit port and to directly move the poppet toward the seat, and a spring tending to move said member in the opposite direction.

5. In a regulator, a steam-conducting pipe, a valve therein, a fluid pressure-producing pump actuated by steam passing through the valve, means including a member actuated by said fluid pressure for automatically controlling the passage of steam through the valve by causing a closing of the valve proportional to the fluid pressure, and safety means for causing automatically a closing of the valve when the fluid pressure reaches a predetermined minimum, said means including a member actuated by said fluid pressure for preventing such closing action when said fluid pressure is above said minimum.

6. In a regulator, a steam-conducting pipe, a valve therein, means including a resilient element whereby the valve will normally permit the passage of steam therethrough, fluid pressure-producing means driven by steam passing through the valve, means including a member actuated by said fluid pressure for controlling automatically the passage of steam through the valve by causing a closing of the valve against the action of said resilient element proportional to the fluid pressure, safety means including a resilient member normally causing the valve to be closed, and means whereby said fluid pressure acting against said resilient member prevents operation of the safety valve closing means until the fluid pressure reaches a predetermined minimum.

7. In a regulator, a steam-conducting pipe, a valve therein, fluid pressure-producing means actuated by steam passing through the valve, means including a member actuated by said fluid pressure for automatically controlling the passage of steam through the valve by causing a closing of the valve proportional to the fluid pressure, safety means for causing automatically a closing of the valve when the fluid pressure reaches a predetermined minimum, said means including a member actuated by said fluid pressure for preventing such closing action when said fluid pressure is above said minimum, and manually-controlled means for effecting such action of the safety means as to cause opening of the valve when the fluid pressure is less than said minimum.

8. In a regulator, a steam-conducting pipe, a valve therein and including a gate and a steam chamber rearwardly thereof and having a steam exit port therefrom, means including a member actuated by power produced from steam passing through said valve for controlling automatically the passage of steam through the valve by controlling the passage of steam through said exit port, and safety means cooperating with the first-named means for causing automatically a closing of the valve should said first-named means fail to perform its said controlling functions, said safety means including a member cooperating with the first-named means for preventing such closing action while the first-named means is performing its said controlling functions in the normal manner.

9. In a regulator, a steam conducting pipe, a valve therein including a gate cooperating with a seat, means providing a steam chamber rearwardly of the gate, a piston connected to the gate and slidably fitting within the chamber, means providing a limited steam conducting vent from the chamber to said pipe forwardly of the gate and an exit port from the chamber through the piston, and means including a stem cooperating with the end of said exit port within the chamber and actuated by power produced from steam passing through said valve for controlling automatically the passage of steam through the valve by controlling the passage of steam through the exit port.

10. In a regulator, a steam conducting pipe, a valve therein comprising a single poppet cooperating with a seat, means providing a steam chamber rearwardly of the poppet, a piston connected to the poppet and slidably fitting within the chamber, there being a port from the chamber through the piston for the passage of steam between the pipe and chamber, a fluid pressure producing pump actuated by steam passing through the valve, means providing a cylinder, means providing free fluid pressure communication from the pump to the cylinder, and means including a piston within the cylinder and cooperating with the first-named piston and actuated by said fluid pressure for continuously controlling the position of the valve automatically in accordance with the said fluid pressure.

11. In a regulator, a steam conducting pipe, a valve therein including a gate cooperating with a seat, means providing a steam chamber rearwardly of the gate, a piston connected to the gate and slidably fitting within the chamber, means providing a limited steam conducting vent from the chamber to said pipe and a steam exit port through the piston, and means cooperating with said port for controlling the escape of steam therethrough.

12. The regulator defined in claim 11, wherein the last-named means cooperates with the end of said port within the chamber and the other end of the port is located between the piston and gate.

13. In a regulator, a steam conducting pipe, a valve therein comprising a single poppet cooperating with a seat, means providing a steam chamber rearwardly of the poppet, a piston rigidly connected to the poppet and slidably fitting within the chamber, the steam engaging area of and for opening the poppet being less than the steam engaging area of the piston within the chamber for closing the poppet, means providing a limited steam conducting vent from the chamber to the pipe and a steam exit port from the chamber, and means including a member actuated in a direction to close said port by power produced from steam passing through said valve for controlling automatically the passage of steam through the valve by controlling the passage of steam through the exit port.

14. In a regulator, a steam conducting pipe, a valve therein comprising a single poppet cooperating with a seat, means providing a steam chamber rearwardly of the poppet, a piston connected to the poppet and slidably fitting within the chamber, there being a port from the chamber through the piston for the passage of steam between the pipe and chamber, a fluid pressure producing pump actuated by steam passing through the valve, a relatively long open frame extending rearwardly of the chamber and providing a cylinder remote from the chamber, a piston in the cylinder, a rod actuated by the second-named piston and cooperating with the first-named piston, means providing free fluid pressure communication from the pump to the cylinder rearwardly of the second-named piston, a spring mounted in the frame between the two pistons and normally resisting movement of the second-named piston by said fluid pressure, and means screw threaded into the frame between the spring and first-named piston for adjusting the active strength of the spring, the last-named means being accessible for adjustment through the open frame.

WILLIAM A. HEANEY.